US006463064B1

(12) United States Patent
Broockman et al.

(10) Patent No.: US 6,463,064 B1
(45) Date of Patent: Oct. 8, 2002

(54) METHOD AND APPARATUS INTERCONNECTION OF LOCAL AREA NETWORKS WITH WIDE AREA NETWORKS

(75) Inventors: Eric Charles Broockman, Raleigh, NC (US); David Barrett Bryant, Raleigh, NC (US); Lap Thiet Huynh, Raleigh, NC (US); Joseph L. McKinnon, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/512,598

(22) Filed: Aug. 10, 1995

Related U.S. Application Data

(63) Continuation of application No. 07/687,258, filed on Apr. 18, 1991.

(51) Int. Cl.$^7$ ............................................. H04L 12/44
(52) U.S. Cl. ..................................... 370/401; 370/410
(58) Field of Search ................................ 370/282, 386, 370/389, 392, 400, 401, 410, 419, 420; 379/271, 272

(56) References Cited

U.S. PATENT DOCUMENTS 4,897,841 A * 1/1990 Gang, Jr.

(List continued on next page.)

FOREIGN PATENT DOCUMENTS

| DE | 4020618 | 1/1992 | ............ H04M/3/48 |
| JP | 04288758 | 10/1992 | ............ H04M/3/60 |
| JP | 05308668 | 11/1993 | ............ H04Q/3/58 |
| JP | 06070034 | 3/1994 | ............ H04M/3/48 |
| JP | 06334744 | 12/1994 | ............ H04M/3/42 |

OTHER PUBLICATIONS

Udaya, S. et al., "Interworking Between Access Protocol and Network Protocol for Interswitch ISDN Services", 4th IEEE Region 10 International Conf., Bombay, Nov. 22–24 1989, Institute of Electrical and Electronics Engineers, pp. 10–14.
Donaldson, I. et al., "Hybrid Networking for Business Applications", IEE Conference on Telecommunications, Jan. 1, 1991, pp. 112–117.
Review of the Electrical Communications Laboratories vol. 37, No. 2, Mar. 1989 "A High–Speed Hierarchical Integrated Optical LAN System" M. Miyazawa et al.
Computer Networking Symposium Apr. 1988, W. Johannesen et al. "Architecture and Design of an Open Systems LAN/WAN Gateway" pp. 112–119.

*Primary Examiner*—Hassan Kizou
*Assistant Examiner*—Ahmed Elallam
(74) *Attorney, Agent, or Firm*—Gerald R. Woods; Bracewell & Patterson, LLP

(57) ABSTRACT

The method and apparatus of the present invention may be utilized to interconnect multiple local area networks to a data processing network including both multiple network nodes having routing and functional capability within the data processing network and multiple endpoint nodes having only local address capability, while minimizing the amount of routing information which must be maintained within the data processing network. A concentrator node is established for interconnection between each of the multiple local area networks and the data processing network. The concentrator node includes a network node interface having routing and functional capability for an associated local area network and an endpoint node interface having local address capability. When interconnected between a local area network and a selected network node within the data processing network, the concentrator node emulates a network node within the local area network while appearing as an endpoint node within the data processing network. The concentrator node maintains routing information for communication between the local area network and the data processing network in two segments. The first segment details the route between the local area network and the concentrator node while a second segment details the route between the concentrator node and a node within the data processing network.

9 Claims, 3 Drawing Sheets

U.S. PATENT DOCUMENTS

| | | | |
|---|---|---|---|
| 4,901,312 A | | 2/1990 | Hui et al. ................. 370/85.12 |
| 4,975,906 A | * | 12/1990 | Takiyasu et al. |
| 4,996,524 A | * | 2/1991 | Tojima |
| 5,018,133 A | * | 5/1991 | Tsukakoshi et al. |
| 5,079,765 A | * | 1/1992 | Nakamura |
| 5,086,426 A | * | 2/1992 | Tsukakoshi et al. |
| 5,179,555 A | * | 1/1993 | Videlock et al. ............ 370/402 |
| 5,235,595 A | * | 8/1993 | O'Dowd ..................... 370/392 |

\* cited by examiner

METHOD AND APPARATUS INTERCONNECTION OF LOCAL AREA NETWORKS WITH WIDE AREA NETWORKS

CROSS-REFERENCE TO RELATED APPLICATION

This is a continuation of application Ser. No. 07/687,258, filed Apr. 18, 1991.

This application is related to U.S. patent application Ser. No. 07/687,278, entitled "METHOD AND APPARATUS FOR DATA PROCESSING NETWORK INTERCONNECTION," filed of even date herewith, and assigned to the assignee herein.

BACKGROUND OF THE INVENTION

1. Technical Field

The present invention relates in general to computer network communications and in particular to a method and apparatus for interconnecting wide area computer data processing networks with local area computer networks. Still more particularly, the present invention relates to a method and apparatus for interconnecting a wide area computer data processing network with a local area computer network while minimizing the amount of routing information which must be maintained within the wide area computer data processing network.

2. Description of the Related Art

Computer system networks continue to increase in popularity. That is, in large part, because such networks allow applications and users running on many different systems to communicate with each other, providing data and resource sharing. Networks may be limited to a desktop systems located in close physical proximity, or may include thousands of systems of all sizes connected in a worldwide network. In general, networks are flexible, so they may be adapted to suit the needs of their users.

One important type of computer network is referred to as a peer to peer network. With such a network topology each node of the network is considered to be equal with all other nodes. Each node may act as an intermediate node in a communications session, routing sessions between other network nodes. Such networks may also include terminal nodes, which are not required to transmit data between two separate, adjacent systems as part of a communications link between them. A communications session initiated by a node of the network is routed to the nearest node, which selects the routing to be used to the next node in a communications link. One example of such a powerful, flexible system is System Network Architecture (SNA), a network architecture defined by International Business Machines Corporation, and widely used throughout the world.

In a typical network, local networks, or subarea networks are often connected to the remainder of the network through a single, fully featured, network node. Such network nodes must have full routing and functional capability within the network, but terminal nodes, such as workstations, which are connected to a network node need not have such a capability. Even if only a few low end workstations in a single physical location are connected to a wide area network, a system capable of supporting full network node functions must typically be placed locally to allow such network access.

A full network node must be a relatively powerful system capable of supporting a wide variety of network functions. For example, an SNA network node must be capable of acting as an intermediate node in a session between two nodes which may be connected through a large number of additional intermediate nodes. The network node maintains a route selection table for many of the logical units in the network, and has the capability to search for and determine the location of any node within the network given its logical unit identifier. When a logical unit requests a session with another logical unit, a network node receiving such a request must locate the target logical unit, either in its route selection table, or by searching for it, and thereafter establish communication sessions with both the logical unit making the request and a companion session with another adjacent node. The other adjacent node may be the target logical unit, or it may be another intermediate node utilized to establish a link to the target logical unit.

Once a session has been set up between two logical units, the network node routes incoming data to the appropriate outgoing communications link. Various services are provided by the network node. These may include, for example, adaptive pacing of data, renegotiation of bind values, and similar services. The numerous functions required of a network node are well documented, and well known to those skilled in the art.

The complex functions and duties required of a network node are in part due to the requirement that each network node within such a network must have the ability to provide route selection, directory search processing and intermediate routing functions for all nodes within the network. As a result, each network node must maintain a topology database which specifies all interconnected nodes within the network. This topology database is replicated among all network nodes within a data processing network while local address information, such as that found within endpoint nodes, is provided on an as-required basis.

In a large network, network topology databases may grow to a significant amount of data. This in turn can result in significant network performance degradation due to several reasons. The link bandwidth consumed by topology database updates increases substantially as a result of larger databases. As a consequence, user data frames may experience longer and longer delays due to the high transmission priority of network topology database updates.

Additionally, the processing time of route collections increases exponentially as the number of links and networks within a network increases. As a consequence, session set-up time will be substantially lengthened. Additionally, building a large spanning from which routes are chosen requires additional processor capacity. As a result, less processor capacity is available for user applications. Finally, slower reaction times due to failures and slower response times due to increased time to propagate topology database updates and searches through a large network will further degrade the performance of a data processing network.

This problem is increased in severity due to the proliferation of local area networks and the growth of data processing networks in size. For purposes of this application the term "local area network" is utilized to mean traditional local area networks as well as subregion networks, subarea networks, star networks and other such networks. In networks in which a large number of such local area networks are interconnected by a wide area network, at least one network node within each local area network must be connected to the wide area network. Due to the requirement that the entire network topology must be replicated within every network node within the network, each local area network connected to the wide area network requires three entries to be made in the network topology database which is replicated throughout the network. A specification of the network node and the two bi-directional links associated with that network node must be maintained for each local area network interconnected with a wide area network. Networking then flows through the local area network server into the local area network and intermediate session routing is typically done by the network node acting as the local area network server. In large networks, a local area network server performing the backbone intermediate session routing function is frequently undesirable.

In view of the above, it should be apparent that a need exists for a method of efficient coupling multiple local area networks together with a wide area network while minimizing the amount of routing information which must be maintained within the wide area data processing network.

SUMMARY OF THE INVENTION

It is therefore one object of the present invention to provide an improved computer network communications systems.

It is another object of the present invention to provide an improved method and apparatus for interconnecting local area networks with wide area data processing networks.

It is yet another object of the present invention to provide an improved method and apparatus for interconnecting multiple local area networks with wide area data processing networks while minimizing the amount of routing information which must be maintained within the wide area data processing network.

The foregoing objects are achieved as is now described. The method and apparatus of the present invention may be utilized to interconnect multiple local area networks to a data processing network including both multiple network nodes having routing and functional capability within the data processing network and multiple endpoint nodes having only local address capability, while minimizing the amount of routing information which must be maintained within the data processing network. A concentrator node is established for interconnection between each of the multiple local area networks and the data processing network. The concentrator node includes a network node interface having routing and functional capability for an associated local area network and an endpoint node interface having local address capability. When interconnected between a local area network and a selected network node within the data processing network, the concentrator node emulates a network node within the local area network while appearing as an endpoint node within the data processing network, permitting full connectivity between the local area network and the data processing network. The concentrator node maintains routing information for communication between the local area network and the data processing network in two segments. The first segment details the route between the local area network and the concentrator node while a second segment details the route between the concentrator node and a node within the data processing network.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
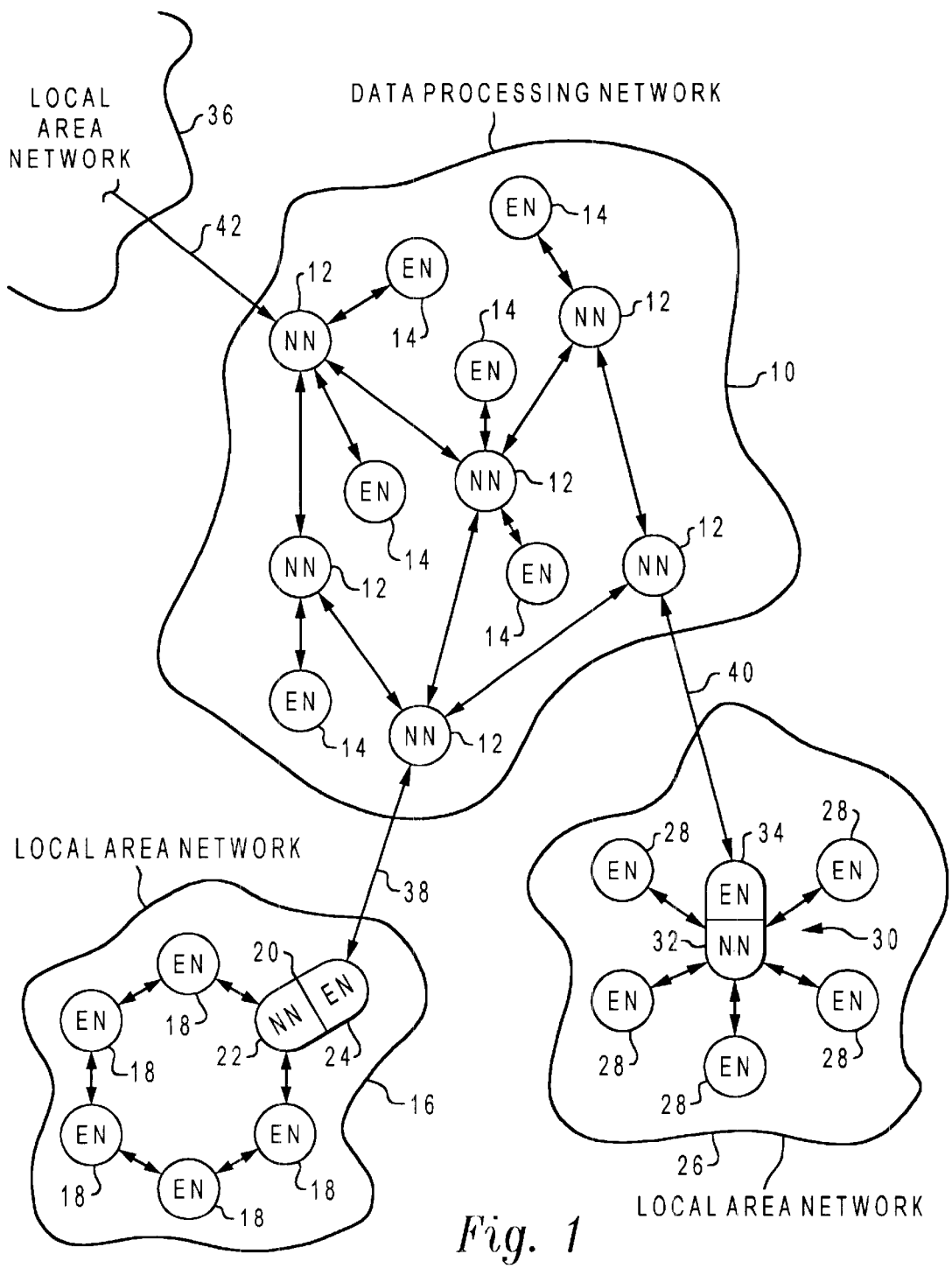
FIG. 1 depicts a pictorial representation of multiple local area networks interconnected with a data processing network utilizing the method and apparatus of the present invention.

With reference now to the figures and in particular with reference to FIG. 1, there is depicted a pictorial representation of multiple local area networks interconnected with a data processing network utilizing the method and apparatus of the present invention. As is illustrated, a wide area data processing network is depicted which includes a plurality of network nodes 12. Each network node 12, in accordance with well known standards for so-called peer-to-peer networks includes a topology database which lists each interconnected network node within wide area data processing network 10. This topology database is replicated at each network node 12 within wide area data processing network 10, and it is an object of the present invention to minimize the amount of data which must be contained within that topological database by providing a method and apparatus whereby the topological data for network nodes utilized within attached local area networks may be maintained at the local area network and not within wide area data processing network 10.

Still referring to wide area data processing network 10 it may be seen that a plurality of endpoint nodes 14 are interconnected within wide area data processing network 10 to various network nodes 12. Those skilled in the data processing network art will appreciate that endpoint nodes include only local address capability and communicate with an associated network node by specifying the link which connects that endpoint node to the associated network node.

The interconnection of wide area data processing network 10 to other data processing networks is not a trivial task. Network nodes, such as network nodes 12 within wide area data processing network 10, are restricted within such data processing networks to interconnection with other network nodes within that data processing network or endpoint nodes within any data processing network. This requirement is due to the fact that each network node within a wide area data processing network, such as wide area data processing network 10, must replicate the entire topology database for all network nodes and interconnections within that network. Thus, the interconnection of two data processing networks via two network nodes will require the entire topological database of one network to be replicated throughout each network node within the other data processing network. Similarly, the network nodes within the newly connected data processing network must replicate the entire topological database of the existing data processing network. Interconnection between a network node within a data processing network and an endpoint node in any other data processing network is permitted since endpoint nodes have only local address capability and must specify the link between an associated network node and that endpoint node during communication.

Still referring to FIG. 1, it can be seen that local area network 16 has been linked to wide area data processing network 10 via link 38. Local area network 16 preferably comprises a ring network of endpoint nodes 18 which are interconnected utilizing any technique well known in the art. As is illustrated, each endpoint node 18 is interconnected with a concentrator node 20. Concentrator node 20, in accordance with an important aspect of the present invention, includes a network node interface 22 and an endpoint node interface 24. By network node interface what is meant is an interface having routing and functional capability within local area network 16 such that concentrator node 20 will appear to those nodes within local area network 16 as a network node capable of routing information throughout local area network 16.

Additionally, endpoint node interface 24 is created having only local address capability. In this manner, endpoint node interface 24 of concentrator node 20 within local area network 16 may be linked via link 38 to a network node 12 within wide area data processing network 10 in accordance with existing standards for interconnecting endpoint nodes with an existing peer-to-peer network. In this manner, the routing and functional capability information contained within concentrator node 20 need not be replicated at each network node within wide area data processing network 10 and as a consequence, the topological database requirements for each network node within wide area data processing network 10 may be minimized.

Similarly, a second local area network 16, comprising a star network, may also be coupled to wide area data processing network 10 utilizing a concentrator node 30 in accordance with the method of the present invention. As above, local area network 26 includes a plurality of endpoint nodes 28 which are all coupled, in star network fashion, to network node interface 32 of concentrator node 30. In a manner similar to that described above, an endpoint node interface 34 is included within concentrator node 30 and is utilized to couple local area network 26 to a network node 12 within wide area data processing network 10 via link 40. In a manner similar to that described above, the topological database information for local area network 26 is then maintained within network node interface 32 of concentrator node 30 and need not be replicated within each network node 12 of wide area data processing network 10. Finally, a third local area network 36 is partially depicted as interconnected to wide area data processing network 10 via link 42.

Upon reference to the foregoing those skilled in the art will appreciate that by establishing a concentrator node within any processor suitable for implementation of a network node, such as the Application System/400, midrange computer manufactured by International Business Corporation of Armonk, New York, and by thereafter establishing both a network node interface and an endpoint node interface within each concentrator node, the amount of topological data which must be maintained within a wide area data processing network may be minimized by excluding that topological data which pertains to local area networks which have been coupled to a wide area data processing network. As a consequence, the performance of the wide area data processing network will be enhanced due to the decreased amount of time it required for topology database updates and a concomitant decrease in link bandwidth consumed by such updates. Additionally, the amount of processor time within wide area data processing network 10, which is required to establish links and to perform session set-up will be decreased due to the decreased amount of topology which must be considered.

Figure 2:
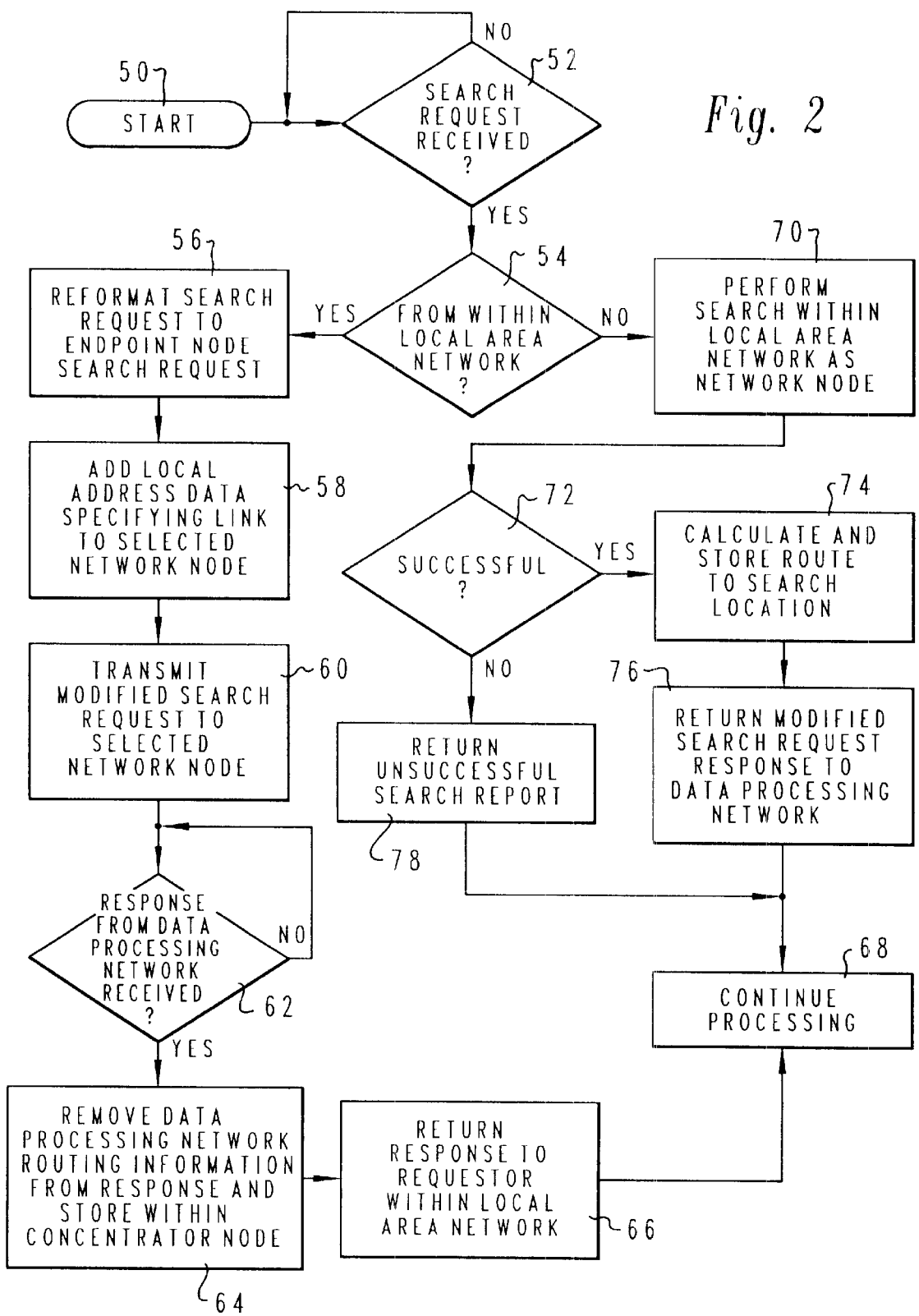
FIG. 2 is a high level logic flowchart illustrating a directory search request utilizing the method and apparatus of the present invention.

Referring now to FIG. 2, there is depicted a high level logic flowchart illustrating a directory search request utilizing the method and apparatus of the present invention. As illustrated, this process begins at block 50 and thereafter passes to block 52. Block 52 depicts a determination of whether or not a directory search request has been received at concentrator node 20 (see FIG. 1). If not, the process merely iterates until such time as a directory search request has been received. After receiving a search request, the process then passes to block 54, which depicts a determination of whether or not the directory search request was received from within the local area network. That is, local area network 16 of FIG. 1. For purposes of this explanation it will be assumed that a search request received from within the local area network will be destined for the wide area data processing network. A search request for within the local area network will be processed in a manner well known in the art. After determining that a search request is destined for the wide area data processing network, the process then passes to block 66 which illustrates the reformatting of the search request to resemble an endpoint node search request, in a manner well known in the art.

After reformatting the search request to resemble an endpoint node search request, block 58 depicts the adding of local address data to the search request specifying at least the link between concentrator node 20 and a network node 12 within wide area data processing network 10. In the depicted embodiment of FIG. 1, this link will be link 38.

Next, the modified search request is transmitted to a network node 12 within wide area data processing network 10. At this point, the process passes to block 62 which illustrates the determination of whether or not a response from the wide area data processing network has been received. If not, the process merely iterates until such time as a response to the directory search request has been received. After receiving a response from the wide area data processing network to the directory search request, the process then passes to block 64. Block 64 illustrates the removal of non-native network routing information specifying the route to the target system within wide area data processing network 10 and the storing of that routing information within the concentrator node. Thereafter, the process returns the response to the requestor within local area network 16, as illustrated in block 66 and the process then passes to block 68 and continues processing.

Referring again to block 54, in the event the directory search request received is from wide area data processing network 10, as determined within block 54, the process passes to block 70. Block 70 illustrates the performance of the search within the local area network, with concentrator node 20 acting as a network node within local area network 16. Thereafter, block 72 depicts a determination of whether or not the search was successful. If so, the process passes to block 74 which illustrates the calculation of the route to the target system within local area network 16 and the storing of that route information at concentrator node 20. Thereafter, the process passes to block 76 which depicts the returning of the modified search request responses to wide area data processing network 10.

Referring again to block 72, in the event the search within local area network 16 was unsuccessful, block 78 illustrates the returning of an unsuccessful search report and thereafter, the unsuccessful search report is returned to wide area data processing network 10 via link 38 to network node 12 and the process then passes to block 68 and continues processing.

Figure 3:
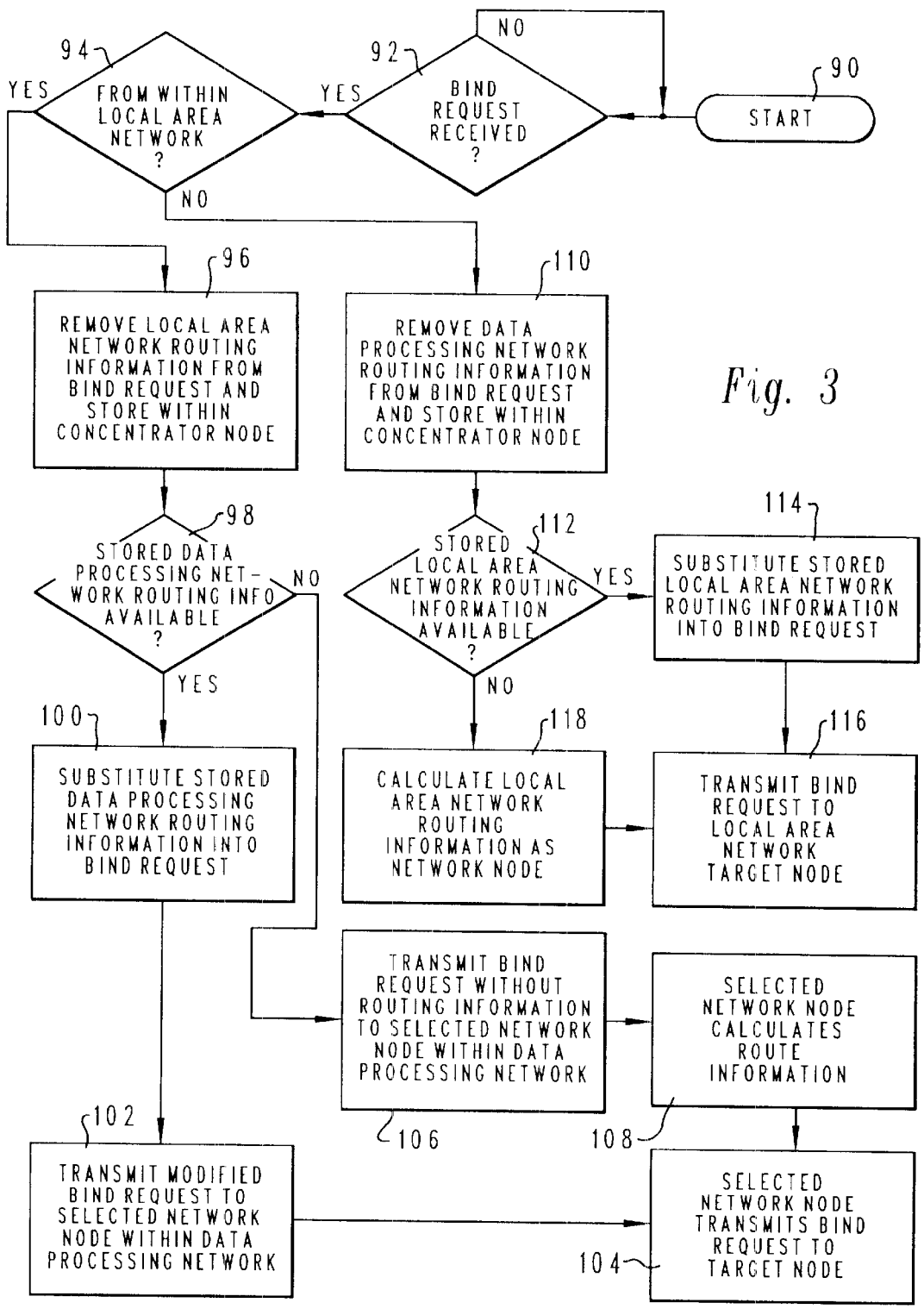
FIG. 3 a high level logic flowchart illustrating a bind request utilizing the method and apparatus of the present invention.

Finally, with reference to FIG. 3, there is depicted a high level logic flowchart illustrating a bind request utilizing the method and apparatus of the present invention. Those skilled in the art will appreciate that "bind" is a command utilized to initiate and terminate session level communications utilizing the aforementioned System Network Architecture (SNA).

As above, the process begins at block 90 and thereafter passes to block 92 which depicts a determination of whether or not a bind request to initiate a session level connection level has been received. If not, the process merely iterates until such time as a bind request is received. After receiving a bind request, as depicted in block 92, the process passes to block 94. Block 94 illustrates a determination of whether or not the bind request has been received from within local area network 16. As above, for purposes of this explanation, it will be assumed that a bind request received from within local area network 16 will be destined for wide area data processing network 10. A bind request for within local area network 16 will be processed locally in a manner well known in the art. If the bind request received is from within local area network 16, and it is destined for wide area data processing network 10, the process passes to block 96. Block 96 illustrates the removal of the local area network routing information, which determines the route from the requestor within the local area network to the concentrator node, and the storage of that routing information within concentrator node 20. Next, the process passes to block 98.

Block 98 illustrates a determination of whether or not stored wide area data processing network routing information is available at the concentrator node for this request and response. Referring again to FIG. 2, this wide area data processing network routing information was removed from the response from the wide area data processing network and stored within the concentrator node, as depicted within block 64. However, this information may have been aged out of the concentrator node and may not be available.

In the event the wide area data processing routing information is available, as depicted in block 98, the proc ess then passes to block 100 which illustrates the substitution of the stored wide area data processing network routing information into the bind request. Thereafter, the process passes to block 102, which depicts the transmitting of the modified bind request to the wide area data processing network for routing within the wide area data processing network. The process then passes to block 104 which depicts the transmitting of the modified bind request to the wide area data processing network for transmittal to the target node wit hin the wide area data processing network.

Referring again to block 98, in the event the stor ed wide area data processing network routing information is no longer available, the process passes to block 106. Block 106 illustrates t he transmitting of the bind request to the wide area data processing network node without routing information. T hereafter, as illustrated in blo ck 108 the wide area data processing network node will calculate the necessary route information utilizing the topology database contained therein and the process will again pass to block 104, depicting the transmittal by tha t network node of the bind request to a target node within the wide area data processing network.

Referring once again to block 94, in the event the bind request received at concentrator node 20 is not from within the local area network, the process passes from block 94 to block 110. Block 110 depicts the removal of the wide area data processing network routing information from the bind request and the storing of that wide area data processing network routing information within the concentrator node. Thereafter, the process passes to block 112. Block 112 illustrates a determination of whether or not stored local area network routing information is available for this particular request. Referring again to FIG. 2, the routing information necessary to reach a target node within the local area network was calculated and stored, as depicted within block 74 of FIG. 2. However, as discussed above, this information may no longer be available, and if not, the process passes to block 118, which depicts the calculation of local area network routing information by concentrator node 20, acting in its capacity as a network node within the local area network.

Referring again to block 112, in the event the local area network routing information stored within the concentrator node is still available, the process passes to block 114. Block 114 illustrates the substitution of the stored local area network routing information into the bind request and thereafter, or after calculating the local area network routing information necessary, as depicted in block 118, the process will pass to block 116. Block 116 depicts the transmitting of the bind request to a local area network target node.

Upon reference to the foregoing, those skilled in the art will appreciate that the Applicants in the present application have created a novel concentrator node which permits full scale interconnection between a local area network and a wide area network, but which minimizes the amount of topological information such as routing and functional capability information which must be maintained within the wide area data processing network. By establishing a border node having both a network node interface and an endpoint node interface, and by selectively emulating a network node within the local area network or the endpoint node at the interface to a wide area data processing network, the local area network may be interconnected to the wide area data processing network while minimizing the amount of routing information which must be stored within the wide area data processing network.

While the invention has been particularly shown and described with reference to a preferred embodiment, it will be understood by those skilled in the art that various changes in form and detail may be made therein without departing from the spirit and scope of the invention.

What is claimed is:

1. A method for interconnecting a plurality of local area networks with a data processing network which includes both a plurality of network nodes having routing and functional capability within said data processing network and a plurality of endpoint nodes, each including only local address capability, while minimizing the amount of routing information maintained within said data processing network, said method comprising the steps of:

establishing a concentrator node within each of said plurality of local area networks;

establishing within each concentrator node a network node interface having routing and functional capability for an associated local area network;

establishing within each concentrator node an endpoint node interface having local address capabilities; and linking said endpoint node interface of each concentrator node to a selected network node within said data processing network, identifying each concentrator node as an endpoint node having local address capability within said data processing network wherein routing information for each local area network is not maintained within said data processing network.

2. The method for interconnecting a data processing network and a plurality of local area networks according to claim 1, further including the step of transmitting directory search requests from within a local area network to said data processing network via an associated concentrator node.

3. The method for interconnecting a data processing network and a plurality of local area networks according to claim 2, further including the step of adding local address information to each directory search request at said associated concentrator node prior to transmitting each directory search request to said data processing network, said local address information specifying at least said link between said concentrator node and said selected network node within said data processing network.

4. The method for interconnecting a data processing network and a plurality of local area networks according to claim 3, further including the step of removing data processing network routing information from each directory search request response received at said concentrator node from said selected network node within said data processing network and storing said data processing network routing information within said concentrator node prior to returning said directory search request response to said local area network.

5. The method for interconnecting a data processing network and a plurality of local area networks according to claim 4, further including The step of transmitting a bind request after a successful directory search request from said local area network to said data processing network via said concentrator node and said selected network node within said data processing network.

6. The method for interconnecting a data processing network and a plurality of local area networks according to claim 5, further including the step of removing local area network routing information from said bind request received from said local area network at said concentrator node and storing said local area network routing information at said concentrator node prior to transmitting said bind request to said data processing network.

7. The method for interconnecting a data processing network and a plurality of local area networks according to claim 6, further including the step of substituting data processing network routing information stored at said concentrator node into said bind request in place of said removed local area network routing information prior to transmitting said bind request from said concentrator node to said selected node within said data processing network.

8. The method for interconnecting a data processing network and a plurality of local area networks according to claim 1, further including the step of transmitting directory search requests from within said data processing network to said local area network via said concentrator node.

9. A concentrator node for interconnecting a local area network with a data processing network which includes both a plurality of network nodes having routing and functional capability within said data processing network and a plurality of endpoint nodes, each including only local address capability, while minimizing the amount of routing information maintained within said data processing network, said concentrator node comprising:

a network node interface within said concentrator node having routing and functional capability within said local area network;

an endpoint node interface within said concentrator node having local address capabilities; and means for selectively linking said endpoint node interface within said concentrator node with a selected network node within said data processing network.

* * * * *